US009688785B2

(12) United States Patent
Jariwala et al.

(10) Patent No.: US 9,688,785 B2
(45) Date of Patent: Jun. 27, 2017

(54) FLUORINATED COMPOSITIONS AND SURFACE TREATMENTS MADE THEREFROM

(71) Applicant: 3M INNOVATIVE PROPERTIES COMPANY, St. Paul, MN (US)

(72) Inventors: Chetan P. Jariwala, Woodbury, MN (US); Gregory D. Clark, Silver Spring, MD (US); Jason T. Petrin, Woodbury, MN (US); Rudolf J. Dams, Antwerp (BE); Steven J. Martin, Shoreview, MN (US); Mark J. Pellerite, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 79 days.

(21) Appl. No.: 14/610,727

(22) Filed: Jan. 30, 2015

(65) Prior Publication Data

US 2015/0147579 A1    May 28, 2015

Related U.S. Application Data

(62) Division of application No. 12/663,027, filed as application No. PCT/US2008/065885 on Jun. 5, 2008, now Pat. No. 8,945,712.

(60) Provisional application No. 60/942,397, filed on Jun. 6, 2007.

(51) Int. Cl.
| | |
|---|---|
| *C08F 14/18* | (2006.01) |
| *C08F 8/40* | (2006.01) |
| *C09D 127/12* | (2006.01) |
| *C08F 220/22* | (2006.01) |
| *C08F 220/36* | (2006.01) |
| *C08J 3/09* | (2006.01) |
| *C09D 133/06* | (2006.01) |
| *C09D 133/14* | (2006.01) |
| *C09D 133/16* | (2006.01) |
| *C09D 143/02* | (2006.01) |
| *C08F 220/10* | (2006.01) |
| *C08F 220/18* | (2006.01) |

(52) U.S. Cl.
CPC .............. *C08F 14/185* (2013.01); *C08F 8/40* (2013.01); *C08F 220/22* (2013.01); *C08F 220/36* (2013.01); *C08J 3/09* (2013.01); *C09D 127/12* (2013.01); *C09D 133/06* (2013.01); *C09D 133/14* (2013.01); *C09D 133/16* (2013.01); *C09D 143/02* (2013.01); *C08F 220/10* (2013.01); *C08F 220/18* (2013.01); *C08J 2333/16* (2013.01); *Y10T 428/3154* (2015.04); *Y10T 428/31678* (2015.04)

(58) Field of Classification Search
None
See application file for complete search history.

(56) References Cited

U.S. PATENT DOCUMENTS

| | | |
|---|---|---|
| 2,732,398 A | 1/1956 | Brice |
| 2,803,615 A | 8/1957 | Ahlbrecht |
| 3,094,547 A | 6/1963 | Heine |
| 3,274,244 A | 9/1966 | MacKenzie |
| 3,306,855 A | 2/1967 | Borecki |
| 3,492,374 A | 1/1970 | Le Bleu |
| 3,553,179 A | 1/1971 | Bartlett |
| 3,901,727 A | 8/1975 | Loudas |
| 4,557,837 A | 12/1985 | Clark |
| 5,132,446 A | 7/1992 | Tohzuka |
| 5,256,318 A | 10/1993 | Masutani |
| 5,270,378 A | 12/1993 | Johnson |
| 5,368,931 A * | 11/1994 | Kato ................... C08F 2/08 101/457 |

(Continued)

FOREIGN PATENT DOCUMENTS

| | | |
|---|---|---|
| CA | 761007 | 6/1967 |
| EP | 0 603 697 B1 | 9/1997 |

(Continued)

OTHER PUBLICATIONS

International Search Report, PCT/US2008/065885, Aug. 8, 2008, 5 Pages.

(Continued)

*Primary Examiner* — Kara Boyle

(57) ABSTRACT

A composition comprising at least one first divalent unit represented by formula:

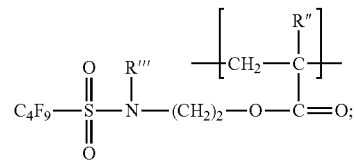

and at least one of a second divalent unit comprising a pendant Z group or a monovalent unit comprising a thioether linkage and a terminal Z group, wherein each Z group is independently selected from the group consisting of —P(O)(OY)$_2$ and —O—P(O)(OY)$_2$. R" and R'" are each independently selected from the group consisting of hydrogen and alkyl having from 1 to 4 carbon atoms. Y is selected from the group consisting of hydrogen, alkyl, trialkylsilyl, and a counter cation. Methods of treating a surface using these compositions and articles with a surface in contact with these compositions are provided. Methods of making these compositions are also provided.

20 Claims, No Drawings

(56) References Cited

U.S. PATENT DOCUMENTS

| | | |
|---|---|---|
| 5,414,102 A | 5/1995 | Pohmer |
| 5,424,474 A | 6/1995 | Pohmer |
| 5,447,982 A | 9/1995 | Kamba |
| 5,550,277 A | 8/1996 | Paciorek |
| 5,691,000 A | 11/1997 | Montagna |
| 5,785,882 A | 7/1998 | Yamamoto |
| 5,929,290 A | 7/1999 | Komiya |
| 6,048,952 A | 4/2000 | Behr |
| 6,184,187 B1 | 2/2001 | Howell |
| 6,315,822 B1 | 11/2001 | Oharu |
| 6,525,127 B1 * | 2/2003 | Jariwala ............... C07C 323/52 524/462 |
| 6,664,354 B2 | 12/2003 | Savu |
| 6,824,882 B2 | 11/2004 | Boardman |
| 6,923,921 B2 | 8/2005 | Flynn |
| 6,995,222 B2 | 2/2006 | Buckanin |
| 7,094,829 B2 | 8/2006 | Audenaert |
| 7,141,537 B2 | 11/2006 | Audenaert |
| 7,678,426 B2 | 3/2010 | Flynn |
| 8,945,712 B2 | 2/2015 | Dams |
| 2003/0073588 A1 | 4/2003 | Howell |
| 2003/0224112 A1 | 12/2003 | Dams |
| 2004/0048957 A1 | 3/2004 | Medsker |
| 2005/0048288 A1 | 3/2005 | Flynn |
| 2006/0142518 A1 | 6/2006 | Qiu |
| 2007/0197717 A1 | 8/2007 | Ueda |
| 2009/0149616 A1 | 6/2009 | Audenaert |
| 2010/0179262 A1 | 7/2010 | Dams |
| 2011/0247823 A1 | 10/2011 | Dams |

FOREIGN PATENT DOCUMENTS

| | | |
|---|---|---|
| EP | 0 870 778 A1 | 10/1998 |
| EP | 1 225 178 A1 | 7/2002 |
| EP | 1 311 637 B1 | 4/2006 |
| JP | 60-262870 | 12/1985 |
| JP | 2006 251642 A | 9/2006 |
| JP | 2006 276817 A | 10/2006 |
| WO | WO 01/30873 | 5/2001 |
| WO | WO 2005/105872 | 11/2005 |

OTHER PUBLICATIONS

Pellerite, Mark J., "Effects of Fluorination on Self-Assembled Monolayer Formation from Alkanephosphonic Acids on Aluminum: Kinetics and Structure," *Journal of Physical Chemistry B*, vol. 107 (2003) p. 11726-11736.

Tonelli, "Linear Perfluoropolyether Difunctional Oligomers: Chemistry, Properties and Applications", J. Fluorine Chem., 1999, vol. 95, pp. 51-70.

\* cited by examiner

FLUORINATED COMPOSITIONS AND SURFACE TREATMENTS MADE THEREFROM

CROSS-REFERENCE TO RELATED APPLICATIONS

This application is a divisional of U.S. application Ser. No. 12/663,027, filed Dec. 4, 2009, now U.S. Pat. No. 8,945,712, which is a national stage filing under 35 U.S.C. §371 of PCT/US2008/065885, filed Jun. 5, 2008, which claims priority to U.S. Provisional Application No. 60/942,397, filed Jun. 6, 2007, the disclosures of which are incorporated by reference in their entirety herein.

BACKGROUND

Fluorochemicals have been used to provide properties such as hydrophobicity, oleophobicity, and stain resistance to various materials (e.g., ceramics, fabrics, and porous stones). The particular properties affected depend, for example, on the particular composition of the fluorochemical and the particular material treated with the fluorochemical.

Traditionally many widely used fluorochemical treatments included long-chain perfluoroalkyl groups, (e.g., perfluorooctyl groups). Recently, however, there has been an industry trend away from using perfluorooctyl fluorinated compounds, which has resulted in a desire for new types of fluorinated surface treatments.

SUMMARY

In one aspect, the present invention provides a composition comprising at least one first divalent unit represented by formula:

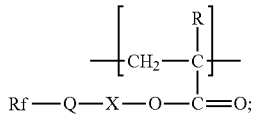

and at least one of
   a second divalent unit comprising a pendant Z group; or
   a monovalent unit comprising a thioether linkage and at least one terminal Z group, wherein each Z group is independently selected from the group consisting of $-P(O)(OY)_2$ and $-O-P(O)(OY)_2$;
  wherein
  each Rf is independently a perfluoropolyether group;
  each Q is independently selected from the group consisting of a bond, $-C(O)-N(R^1)-$, and $-C(O)-O-$;
  R and $R^1$ are each independently selected from the group consisting of hydrogen and alkyl having from 1 to 4 carbon atoms;
  each X is independently selected from the group consisting of alkylene, arylalkylene, and alkylarylene, wherein alkylene, arylalkylene, and alkylarylene are each optionally interrupted by at least one ether linkage; and
  each Y is independently selected from the group consisting of hydrogen, alkyl, trialkylsilyl, and a counter cation.

In another aspect, the present invention provides a method of treating a surface, the method comprising contacting the surface with a composition according to the present invention.

In another aspect, the present invention provides an article having a surface, wherein at least a portion of the surface is in contact with a composition, the composition comprising at least one first divalent unit represented by formula:

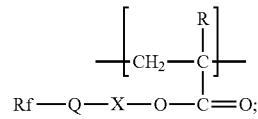

and at least one of
   a second divalent unit comprising a pendant $Z^1$ group; or
   a monovalent unit comprising a thioether linkage and at least one terminal $Z^1$ group, wherein each $Z^1$ group is independently selected from the group consisting of $-P(O)(OY^1)_2$ and $-O-P(O)(OY^1)_2$;
  wherein
  each Rf is independently a perfluoropolyether group;
  each Q is independently selected from the group consisting of a bond, $-C(O)-N(R^1)-$, and $-C(O)-O-$;
  R and $R^1$ are each independently selected from the group consisting of hydrogen and alkyl having from 1 to 4 carbon atoms;
  each X is independently selected from the group consisting of alkylene, arylalkylene, and alkylarylene, wherein alkylene, arylalkylene, and alkylarylene are each optionally interrupted by at least one ether linkage; and
  each $Y^1$ is independently selected from the group consisting of hydrogen, alkyl, a counter cation, and a bond to the surface.

In some embodiments of the foregoing aspects, the surface comprises at least one of metal, metal oxide, ceramic (i.e., glasses, crystalline ceramics, glass ceramics, and combinations thereof), natural stone, or a cementicious surface (e.g., grout, concrete, and engineered stone). In some embodiments of the foregoing aspects, the surface is on at least one of a faucet, a faucet handle, a sink, an oven range, an oven range hood, a countertop, flooring, or wall covering.

In some embodiments of the foregoing aspects, each first divalent unit is represented by formula:

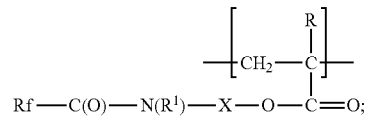

the second divalent unit is represented by a formula selected from the group consisting of:

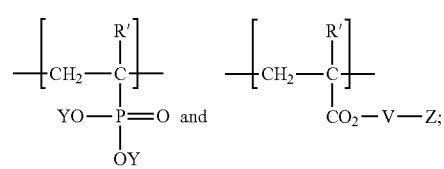

and
   the monovalent unit comprising a thioether linkage and at least one terminal Z group is represented by formula:

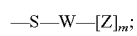

wherein
R' is independently selected from the group consisting of hydrogen and alkyl having from 1 to 4 carbon atoms;
V is alkylene that is optionally interrupted by at least one ether linkage or amine linkage;
W is a divalent or trivalent linking group selected from the group consisting of alkylene, arylalkylene, and arylene, wherein alkylene is optionally interrupted by at least one ether linkage, ester linkage, or amide linkage;
each Z group is independently selected from the group consisting of —P(O)(OY)$_2$ and —O—P(O)(OY)$_2$;
each Y is independently selected from the group consisting of hydrogen, alkyl, trialkylsilyl, and a counter cation; and
m is 1 or 2.

Compositions according to the present invention include compositions comprising one (in some embodiments, 2, 3, 4, 5, 6, 7, 8, 9, 10, 20, 30, 40, 50 or more) divalent unit represented by formula:

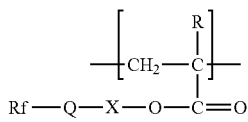

or, in some embodiments, formula:

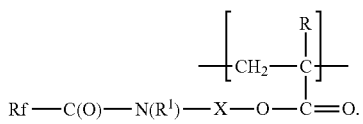

In some embodiments, compositions according to the present invention comprise one (in some embodiments, 2, 3, 4, 5, 6, 7, 8, 9, 10, 20, 30, 40, 50, or more) second divalent unit comprising a pendant Z group.

In another aspect, the present invention provides a composition comprising a first divalent unit represented by formula:

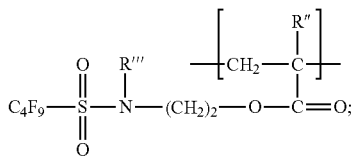

and
at least one of
a second divalent unit represented by formula:

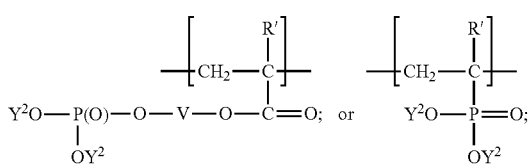

and
a monovalent unit selected from the group consisting of —S—C$_t$H$_{2t+1}$ and —S—C$_r$H$_{2r}$-A; or
a monovalent unit represented by a formula selected from the group consisting of:

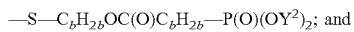
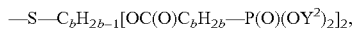

wherein
R', R", and R''' are each independently hydrogen or alkyl having from 1 to 4 carbon atoms;
V is alkylene that is optionally interrupted by at least one ether linkage or amine linkage;
t is an integer having a value from 4 to 22;
r is an integer having a value from 2 to 10;
A is selected from the group consisting of —OH, —COOY$^2$, and —SO$_3$Y$^2$;
each Y$^2$ is independently selected from the group consisting of hydrogen, alkyl, and a counter cation; and
each b is independently an integer from 1 to 5 (in some embodiments, 2 to 3).

In another aspect, the present invention provides an article having a surface, wherein at least a portion of the surface is in contact with a composition, the composition comprising a first divalent unit represented by formula:

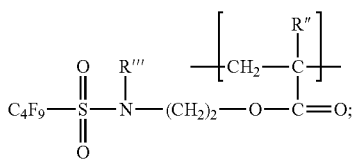

and
at least one of
a second divalent unit represented by formula:

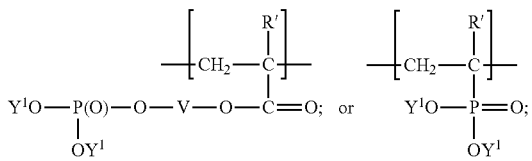

and
a monovalent unit selected from the group consisting of —S—C$_t$H$_{2t+1}$ and —S—C$_r$H$_{2r}$-A; or
a monovalent unit represented by a formula selected from the group consisting of:

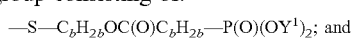
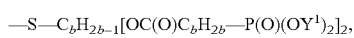

wherein
R', R", and R''' are each independently hydrogen or alkyl having from 1 to 4 carbon atoms;
V is alkylene that is optionally interrupted by at least one ether linkage or amine linkage;
t is an integer having a value from 4 to 22;
r is an integer having a value from 2 to 10;
A is selected from the group consisting of —OH, —COOY$^1$, and —SO$_3$Y$^1$;
each Y$^1$ is independently selected from the group consisting of hydrogen, alkyl, a counter cation, and a bond to the surface; and
each b is independently an integer from 1 to 5 (in some embodiments, 2 to 3).

Compositions according to the present invention typically provide repellent properties to a variety of surfaces and improve the ability to clean these surfaces. For example, compositions according to the present invention can be used on metal surfaces to provide a durable treatment which allows removal of aqueous deposits (e.g., mineral deposits) with a wipe without the need for aggressive scrubbing and aggressive acidic cleaners. In another example, compositions according to the present invention typically impart stain release properties to cementicious substrates (e.g., grout).

In another aspect the present invention provides a method of making a composition, the method comprising reacting components comprising at least one component represented by formula:

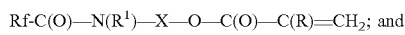

and at least one component represented by formula:

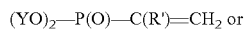

or

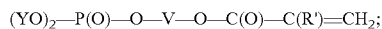

wherein
each Rf is independently a perfluoropolyether group;
R, R', and $R^1$ are each independently selected from the group consisting of hydrogen and alkyl having from 1 to 4 carbon atoms;
each V is independently alkylene that is optionally interrupted by at least one ether linkage or amine linkage; and
each Y is independently selected from the group consisting of hydrogen, alkyl, trialkylsilyl, and a counter cation.

In this application:
The terms "a", "an", and "the" are used interchangeably with "at least one".

"Alkyl group" and the prefix "alk-" are inclusive of both straight chain and branched chain groups and of cyclic groups having up to 30 carbons (in some embodiments, up to 25, 20, 15, 12, 10, 8, 7, 6, or 5 carbons) unless otherwise specified. Cyclic groups can be monocyclic or polycyclic and, in some embodiments, have from 3 to 10 ring carbon atoms.

"Alkylene" is the divalent form of the "alkyl" groups defined above.

"Arylalkylene" refers to an "alkylene" moiety to which an aryl group is attached.

The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

"Arylene" is the divalent form of the "aryl" groups defined above.

"Alkylarylene" refers to an "arylene" moiety to which an alkyl group is attached.

All numerical ranges are inclusive of their endpoints unless otherwise stated.

DETAILED DESCRIPTION

In some embodiments, compositions according to and/or useful for practicing the present invention comprise at least one first divalent unit represented by formula I:

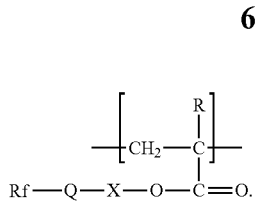

Rf is a perfluoropolyether group. The term "perfluoropolyether" refers to a compound or group having at least 10 (in some embodiments, at least 11, 12, 13, 14, 15, 16, 17, 18, 19, or even 20) carbon atoms and at least 3 (in some embodiments, at least 4, 5, 6, 7, or even 8) ether linkages, wherein the hydrogen atoms on the carbon atoms are replaced with fluorine atoms. In some embodiments, Rf has up to 100, 110, 120, 130, 140, 150, or even 160 carbon atoms and up to 25, 30, 35, 40, 45, 50, 55, or even 60 ether linkages.

Compositions represented by Formula I may contain one perfluoropolyether group or a mixture of perfluoropolyether groups. Typically, the compositions will contain a mixture of perfluoropolyether groups.

In some embodiments, Rf is represented by formula $R_f^a$—O—$(R_f^b$—O—$)_z(R_f^c)$—, wherein $R_f^a$ is a perfluoroalkyl having 1 to 10 (in some embodiments, 1 to 6, 1 to 4, 2 to 4, or 3) carbon atoms; each $R_f^b$ is independently a perfluoroalkylene having 1 to 4 (i.e., 1, 2, 3, or 4) carbon atoms; $R_f^c$ is a perfluoroalkylene having 1 to 6 (in some embodiments, 1 to 4 or 2 to 4) carbon atoms; and z is an integer from 2 to 50 (in some embodiments, 2 to 25, 2 to 20, 3 to 20, 3 to 15, 5 to 15, 6 to 10, or 6 to 8).

Representative $R_f^a$ groups include $CF_3$—, $CF_3CF_2$—, $CF_3CF_2CF_2$—, $CF_3CF(CF_3)$—, $CF_3CF(CF_3)CF_2$—, $CF_3CF_2CF_2CF_2$—, $CF_3CF_2CF(CF_3)$—, $CF_3CF_2CF(CF_3)CF_2$—, and $CF_3CF(CF_3)CF_2CF_2$—. In some embodiments, $R_f^a$ is $CF_3CF_2CF_2$—. Representative $R_f^b$ groups include —$CF_2$—, —$CF(CF_3)$—, —$CF_2CF_2$—, —$CF(CF_3)CF_2$—, —$CF_2CF_2CF_2$—, —$CF(CF_3)CF_2CF_2$—, —$CF_2CF_2CF_2CF_2$—, and —$CF_2C(CF_3)_2$—. Representative $R_f^c$ groups include —$CF_2$—, —$CF(CF_3)$—, —$CF_2CF_2$—, —$CF_2CF_2CF_2$—, and $CF(CF_3)CF_2$—. In some embodiments, $R_f^c$ is —$CF(CF_3)$—.

In some embodiments, $(R_f^b$—O—$)_z$ is represented by —$[CF_2O]_i[CF_2CF_2O]_j$—, —$[CF_2O]_i[CF(CF_3)CF_2O]_j$—, —$[CF_2O]_i[CF_2CF_2CF_2O]_j$—, —$[CF_2CF_2O]_i[CF_2O]_j$—, —$[CF_2CF_2O]_i[CF(CF_3)CF_2O]_j$—, —$[CF_2CF_2O]_i$[$CF_2CF_2CF_2O]_j$—, —$[CF_2CF_2CF_2O]_i[CF(CF_3)CF_2O]_j$—, and $[CF_2CF_2CF_2O]_i[CF(CF_3)CF_2O]_j$—, wherein i+j is an integer of at least 3 (in some embodiments, at least 4, 5, or 6).

In some embodiments, Rf is selected from the group consisting of $C_3F_7O(CF(CF_3)CF_2O)_nCF(CF_3)$—, $C_3F_7O(CF_2CF_2CF_2O)_nCF_2CF_2$—, and $CF_3O(C_2F_4O)_nCF_2$—, and wherein n has an average value in a range from 3 to 50 (in some embodiments, 3 to 25, 3 to 15, 3 to 10, 4 to 10, or even 4 to 7). In some of these embodiments, Rf is $C_3F_7O(CF(CF_3)CF_2O)_nCF(CF_3)$—, wherein n has an average value in a range from 4 to 7. In some embodiments, Rf is selected from the group consisting of $CF_3O(CF_2O)_x(C_2F_4O)_yCF_2$— and $F(CF_2)_3$—O—$(C_4F_8O)_z(CF_2)_3$—, wherein x, y, and z each independently has an average value in a range from 3 to 50 (in some embodiments, 3 to 25, 3 to 15, 3 to 10, or even 4 to 10).

In some embodiments, Rf has a number average molecular weight of at least 500 (in some embodiments at least 750 or even 1000) grams per mole. In some embodiments, Rf has a number average molecular weight of up to 6000 (in some embodiments, 5000 or even 4000) grams per mole. In some embodiments, Rf has a number average molecular weight in a range from 750 grams per mole to 5000 grams per mole.

In divalent units of Formula I, Q is selected from the group consisting of a bond, —C(O)—N(R$^1$)—, and —C(O)—O—, wherein R$^1$ is hydrogen or alkyl of 1 to 4 carbon atoms (e.g., methyl, ethyl, n-propyl, isopropyl, n-butyl, isobutyl, or sec-butyl). In some embodiments, Q is —C(O)—N(R$^1$)—. In some embodiments, R$^1$ is hydrogen or methyl. In some embodiments, R$^1$ is hydrogen. For embodiments of compositions disclosed herein wherein Q is —C(O)—N(R$^1$)—, the compositions may be more hydrolytically stable than embodiments wherein Q is —C(O)—O—.

R is hydrogen or alkyl of 1 to 4 carbon atoms (e.g., methyl, ethyl, n-propyl, isopropyl, n-butyl, isobutyl, or sec-butyl). In some embodiments, R is hydrogen or methyl.

X is selected from the group consisting of alkylene, arylalkylene, and alkylarylene, wherein alkylene, arylalkylene, and alkylarylene are each optionally interrupted by at least one ether linkage. In some embodiments, X is alkylene. In some embodiments, X is ethylene. In some embodiments, X is methylene.

In compositions according to the present invention, when more than one first divalent unit of Formula I is present, each Rf, Q, R, R$^1$, and X group is independently selected.

In some embodiments, the first divalent unit of Formula I is represented by formula:

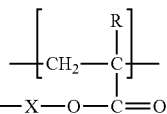
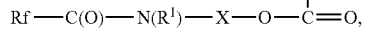

wherein Rf, R, R$^1$, and X are as defined above.

In some embodiments, compositions according to the present invention comprise a second divalent unit comprising a pendant Z group, wherein Z is selected from the group consisting of —P(O)(OY)$_2$ and —O—P(O)(OY)$_2$. In some embodiments, Z is —P(O)(OY)$_2$, and in some embodiments, Z is —O—P(O)(OY)$_2$. Each Y is independently selected from the group consisting of hydrogen, alkyl, trialkylsilyl, and a counter cation. In some embodiments, each Y is hydrogen, and the Z group is a phosphonic acid group or a phosphoric acid group. In some embodiments, at least one Y is alkyl, and the Z group is a phosphate ester or a phosphonate ester. In some embodiments, Y is an alkyl group having 1 to 4 carbon atoms. In some embodiments, at least one Y is a counter cation, and the Z group is a phosphate or phosphonate salt. Exemplary counter cations include alkali metal (e.g., sodium, potassium, and lithium), ammonium, alkyl ammonium (e.g., tetraalkylammonium), and five to seven membered heterocyclic groups having a positively charged nitrogen atom (e.g, a pyrrolium ion, pyrazolium ion, pyrrolidinium ion, imidazolium ion, triazolium ion, isoxazolium ion, oxazolium ion, thiazolium ion, isothiazolium ion, oxadiazolium ion, oxatriazolium ion, dioxazolium ion, oxathiazolium ion, pyridinium ion, pyridazinium ion, pyrimidinium ion, pyrazinium ion, piperazinium ion, triazinium ion, oxazinium ion, piperidinium ion, oxathiazinium ion, oxadiazinium ion, and morpholinium ion). In some embodiments, at least one Y is trialkylsilyl (in some embodiments trimethylsilyl). Other exemplary trialkylsilyl groups include triethylsilyl, t-butyldimethylsilyl, i-propyldimethylsilyl, phenyldimethylsilyl, and di-t-butylmethylsilyl.

In some embodiments, compositions useful for practicing the present invention comprise a second divalent unit comprising a pendant Z$^1$ group, wherein Z$^1$ is selected from the group consisting of —P(O)(OY$^1$)$_2$ and —O—P(O)(OY$^1$)$_2$. Each Y$^1$ is independently selected from the group consisting of hydrogen, alkyl, a counter cation, or a bond to the surface. Each Y$^1$ is independently selected from the group consisting of alkyl, a counter cation, or a bond to the surface. In some embodiments, Y$^1$ is an alkyl group having 1 to 4 carbon atoms. In some embodiments, Y$^1$ is hydrogen. In some embodiments, at least one Y$^1$ is a counter cation, wherein the counter cation may have any definition as defined above for Y. In some embodiments, Y$^1$ is a bond (e.g., covalent bond, hydrogen bond, or ionic bond) to the surface.

In some embodiments, the second divalent unit is represented by formula:

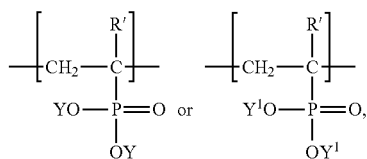

wherein R' is selected from the group consisting of hydrogen and alkyl having from 1 to 4 carbon atoms, and each Y or Y$^1$ is independently defined as above. In some of these embodiments, Y is hydrogen, and R' is hydrogen.

In some embodiments, the second divalent unit is represented by formula:

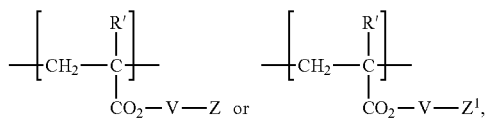

wherein Z is —P(O)(OY)$_2$ or —O—P(O)(OY)$_2$ (in some embodiments —O—P(O)(OY)$_2$), Z$^1$ is —P(O)(OY$^1$)$_2$ or —O—P(O)(OY$^1$)$_2$ (in some embodiments —O—P(O)(OY$^1$)$_2$), and wherein each Y or Y$^1$ is independently defined as above. V is alkylene that is optionally interrupted by at least one ether linkage or amine linkage. In some embodiments, V is alkylene having from 2 to 4 (in some embodiments, 2) carbon atoms. R' is selected from the group consisting of hydrogen and alkyl having from 1 to 4 carbon atoms (e.g., methyl, ethyl, n-propyl, isopropyl, n-butyl, isobutyl, or sec-butyl). In some of these embodiments, R' is selected from the group consisting of hydrogen and methyl.

In some embodiments, compositions according to and/or useful for practicing the present invention comprise a monovalent unit comprising a thioether linkage and at least one terminal Z or Z$^1$ group, wherein Z is selected from the group consisting of —P(O)(OY)$_2$ and —O—P(O)(OY)$_2$, and wherein Z$^1$ is —P(O)(OY$^1$)$_2$ or —O—P(O)(OY$^1$)$_2$. In some of these embodiments, the monovalent unit comprising a thioether linkage and at least one terminal Z group is represented by formula —S—W—[Z]$_m$. In some of embodiments, the monovalent unit comprising a thioether linkage and at least one terminal Z$^1$ group is represented by formula —S—W—[Z$^1$]$_m$. W is a divalent or trivalent linking group selected from the group consisting of alkylene, arylalkylene, and arylene, wherein alkylene is optionally interrupted by at least one ether linkage, ester linkage, or amide linkage, and m is 1 or 2. In some embodiments, W is alkylene (e.g., a linear or branched alkylene) that is interrupted by at least one ester linkage. In some embodiments where a monovalent unit comprising a thioether linkage and at least one terminal Z group is present, typically only one of these monovalent units is present in the composition.

In some embodiments, the monovalent unit comprising a thioether linkage and at least one terminal Z group is represented by a formula selected from the group consisting of:

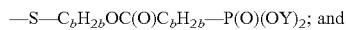
—S—$C_bH_{2b}$OC(O)$C_bH_{2b}$—P(O)(OY)$_2$; and

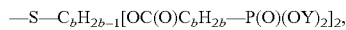
—S—$C_bH_{2b-1}$[OC(O)$C_bH_{2b}$—P(O)(OY)$_2$]$_2$, wherein each b is independently an integer from 1 to 5 (in some embodiments, 2 to 3). In some embodiments, the monovalent unit is —S—$C_bH_{2b}$OC(O)$C_bH_{2b}$—P(O)(OY)$_2$, wherein each b is independently 2 or 3. In some embodiments, the monovalent unit is —S—$C_bH_{2b-1}$[OC(O)$C_bH_{2b}$—P(O)(OY)$_2$]$_2$, wherein each b is independently 2 or 3.

Compositions according to the present invention, in some embodiments, may have both a second divalent unit comprising a pendant Z group and a monovalent unit comprising a terminal Z group and/or may have two different second divalent units. In these embodiments, each Z, Y, V, and R' is independently selected.

In some embodiments, compositions according to the present invention comprise at least one divalent unit represented by formula:

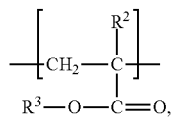

wherein each $R^2$ is independently selected from the group consisting of hydrogen and alkyl having from 1 to 4 carbon atoms (e.g., methyl, ethyl, n-propyl, isopropyl, n-butyl, isobutyl, or sec-butyl), and wherein each $R^3$ is independently alkyl having from 1 to 30 (in some embodiments, 1 to 25, 1 to 20, 1 to 10, 4 to 25, 8 to 25, or even 12 to 25) carbon atoms. In some embodiments, $R^2$ is selected from the group consisting of hydrogen and methyl. In some embodiments, $R^3$ is selected from the group consisting of hexadecyl and octadecyl.

In some embodiments, compositions according to the present invention further comprise at least one divalent unit represented by formula:

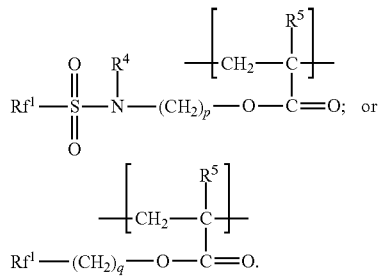

Each $Rf^1$ is independently a perfluoroalkyl group having from 3 to 12 (i.e., 3, 4, 5, 6, 7, 8, 9, 10, 11, or 12) carbon atoms. In some embodiments, each $Rf^1$ is independently a perfluoroalkyl group having from 3 to 6 (e.g., perfluoro-n-hexyl, perfluoro-n-pentyl, perfluoroisopentyl, perfluoro-n-butyl, perfluoroisobutyl, perfluoro-sec-butyl, perfluoro-tert-butyl, perfluoro-n-propyl, or perfluoroisopropyl). In some embodiments, $Rf^1$ is perfluorobutyl (e.g., perfluoro-n-butyl). In some embodiments, $Rf^1$ is perfluoropropyl (e.g., perfluoro-n-propyl). The term "perfluoroalkyl group" includes alkyl groups in which all C—H bonds are replaced by C—F bonds as well as groups in which hydrogen or chlorine atoms are present instead of fluorine atoms provided that up to one atom of either hydrogen or chlorine is present for every two carbon atoms. In some embodiments of perfluoroalkyl groups, when at least one hydrogen or chlorine is present, the perfluoroalkyl group includes at least one perfluoromethyl group.

$R^4$ and $R^5$ are each independently hydrogen or alkyl having from 1 to 4 carbon atoms (e.g., methyl, ethyl, n-propyl, isopropyl, n-butyl, isobutyl, or sec-butyl). In some embodiments, $R^4$ is selected from the group consisting of methyl and ethyl. In some embodiments, $R^5$ is selected from the group consisting of hydrogen and methyl.

Each p is independently an integer having a value from 2 to 11 (i.e., 2, 3, 4, 5, 6, 7, 8, 9, 10, or 11).

Each q is independently an integer having a value from 1 to 4 (i.e., 1, 2, 3, 4, 5, 6, 7, 8, 9, 10, 11, 12, 13, 14, 15, 16, 17, 18, 19, or 20).

In some embodiments, compositions according to the present invention comprise a divalent unit represent by Formula I and a divalent unit represent by Formula IIIa:

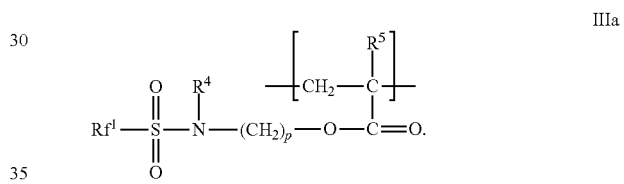

The ratio of divalent units represent by Formula I to divalent units represent by Formula IIIa may be in a range from 99:1 to 1:99 (in some embodiments, 95:5 to 5:95, 90:10 to 10:90, 85:15 to 15:85, 80:20 to 20:80, 75:25 to 25:75, or 90:10 to 50:50). In some embodiments, compositions according to the present invention comprise a divalent unit represent by Formula IIIa and are free of divalent units represented by Formula I. In some embodiments, the divalent unit represented by Formula IIIa is represented by formula:

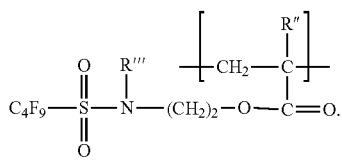

In some embodiments, wherein compositions according to and/or useful for practicing the present invention comprise a divalent unit represented by Formula:

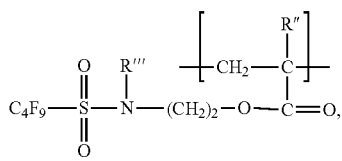

R″ and R‴ are each independently hydrogen or alkyl having from 1 to 4 carbon atoms. In some embodiments, each R″ is independently hydrogen or methyl. In some embodiments, R‴ is methyl or ethyl. In some embodiments, the composition comprises a second divalent unit represented by formula:

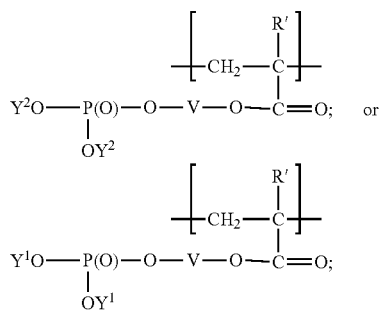

and
a monovalent unit selected from the group consisting of —S—$C_rH_{2t+1}$ and —S—$C_rH_{2r}$-A. In these embodiments, V is alkylene that is optionally interrupted by at least one ether linkage or amine linkage. In some embodiments, V is alkylene having from 2 to 4 (in some embodiments, 2) carbon atoms. R' is selected from the group consisting of hydrogen and alkyl having from 1 to 4 carbon atoms (e.g., methyl, ethyl, n-propyl, isopropyl, n-butyl, isobutyl, or sec-butyl). In some of these embodiments, R' is selected from the group consisting of hydrogen and methyl. t is an integer having a value from 4 to 22 (in some embodiments, 8 to 22, or even 12 to 22). r is an integer having a value from 2 to 10 (in some embodiments, 2 to 6 or even 2 to 4). In some embodiments, A is selected from the group consisting of —OH, —COO$Y^2$, and —$SO_3Y^2$, wherein each $Y^2$ is independently selected from the group consisting of hydrogen, alkyl, and a counter cation (e.g., counter cations described above for the definition of Y). In some embodiments, $Y^2$ is an alkyl group having 1 to 4, 4 to 22, 8 to 22, or 12 to 22 carbon atoms. In some embodiments, $Y^2$ is hydrogen. In some embodiments, A is selected from the group consisting of —OH, —COO$Y^1$, and —$SO_3Y^1$, wherein each $Y^1$ is independently selected from the group consisting of hydrogen, alkyl, a counter cation (e.g., counter cations described above for the definition of Y), and a bond to the surface. In some embodiments, $Y^1$ is an alkyl group having 1 to 4, 4 to 22, 8 to 22, or 12 to 22 carbon atoms. In some embodiments, $Y^1$ is hydrogen. In some embodiments, at least one $Y^1$ is a counter cation, wherein the counter cation may have any definition as defined above for Y. In some embodiments, $Y^1$ is a bond (e.g., covalent bond, hydrogen bond, or ionic bond) to the surface.

In some embodiments, compositions according to the present invention comprise at least one divalent unit represented by formula —[$CH_2$—C($Cl_2$)]— or —[$CH_2$—CHCl]—.

In some embodiments, compositions according to the present invention (e.g., those comprising a divalent unit represented by Formula I) comprise a monovalent unit selected from the group consisting of —S—$C_rH_{2t+1}$ and —S—$C_rH_{2r-(s-1)}$-$(A)_s$, wherein t is an integer having a value from 4 to 22; r is an integer having a value from 2 to 10 (in some embodiments, 2 to 6 or even 2 to 4); s is an integer having a value from 1 to 4; and A is selected from the group consisting of —OH, —COO$Y^2$, and —$SO_3Y^2$, wherein $Y^2$ is selected from the group consisting of hydrogen, alkyl, and a counter cation (e.g., counter cations described above for the definition of Y). In some embodiments, $Y^2$ is alkyl having from 4 to 22, 8 to 22, or 12 to 22 carbon atoms. In some embodiments, compositions according to the present invention comprise a monovalent unit selected from the group consisting of —S—$C_tH_{2t+1}$ and —S—$C_rH_{2r}$-A, wherein t, r, and A are as defined above. In some embodiments, the chain-terminating group is —S—$C_tH_{2t+1}$, wherein t has a value from 4 to 22 (in some embodiments, 8 to 22, or even 12 to 22).

In some embodiments, the first divalent units independently represented by Formula I are present in a range from 25 to 99 (in some embodiments, from 35 to 99, from 50 to 99, from 60 to 98, from 75 to 97, or even from 85 to 97) weight percent, based on the total weight of the composition.

In some embodiments, the second divalent units are present in a range from 1 to 30 (in some embodiments, from 2 to 30, from 3 to 25, or even from 3 to 15) weight percent, based on the total weight of the composition.

In some embodiments of compositions according to the present invention, the first and second divalent groups and any other divalent units present are randomly connected.

Compositions according to the present invention may be prepared, for example, by reacting a mixture containing at least first and second components typically in the presence of a chain transfer agent and an initiator. By the term "reacting" it is meant forming a composition that includes at least one identifiable structural element due to each of the first and second components. Depending on the stoichiometry of the reaction, an oligomer or polymer may be formed. Typically the polymer or oligomer has a distribution of molecular weights and compositions.

In some embodiments, the first component is represented by Formula II:

Rf-Q-X—O—C(O)—C(R)=$CH_2$    II, wherein Rf, Q, R, and X are as defined above for a divalent unit of Formula I. In some embodiments, the compound of Formula II is Rf-C(O)—N($R^1$)—X—O—C(O)—C(R)=$CH_2$, wherein $R^1$ is as defined above for a compound of Formula I.

In some embodiments, the second component comprises at least one polymerizable double bond and at least one of a —P(O)(OY)$_2$ or —O—P(O)(OY)$_2$ group, wherein each Y is independently selected from the group consisting of hydrogen, alkyl, trialkylsilyl, and a counter cation. In some embodiments, the second component is at least one of

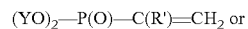

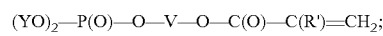

wherein each R' is independently selected from the group consisting of hydrogen and alkyl having from 1 to 4 carbon atoms, and each V is independently alkylene that is optionally interrupted by at least one ether linkage or amine linkage. In some embodiments, V is alkylene having from 2 to 4 (in some embodiments, 2) carbon atoms. In some embodiments, R' is selected from the group consisting of hydrogen and methyl. Some second components of these formulas are available, for example, from commercial sources (e.g, vinylphosphonic acid and ethylene glycol methacrylate phosphate) or can be prepared using known synthetic methods. In some embodiments, the second component is a double-bond containing phosphate available from Uniqema, New Castle, Del., under the trade designations "MAXEMUL 6106" and "MAXEMUL 6112".

In some embodiments, mixtures of more than one first component of Formula II and/or more than one second component of formula $(YO)_2$—$P(O)$—$C(R')$=$CH_2$ or $(YO)_2$—$P(O)$—$O$—$V$—$O$—$C(O)$—$C(R')$=$CH_2$ can be used. In other embodiments, one first component of Formula II and one second component of formula $(YO)_2$—$P(O)$—$C(R')$=$CH_2$ or $(YO)_2$—$P(O)$—$O$—$V$—$O$—$C(O)$—$C(R')$=$CH_2$ can be used.

The component represented by Formula II can be prepared, for example, using known methods. For example, hexafluoropropylene oxide can be polymerized using known methods to form a perfluoropolyether terminated with a fluorocarbonyl group (i.e., —C(O)F). This material can be vacuum distilled to remove components having a molecular weight less than 500 (in some embodiments, in some embodiments, less than 600, 700, 750, 800, 900, or even 1000) grams per mole. The fluorocarbonyl group can optionally be converted to a carboxy or alkoxycarbonyl group by conventional methods. Typically, conversion to an alkoxycarbonyl terminated perfluoropolyether (e.g., conversion to a methyl ester of formula Rf-C(O)—OCH$_3$) is carried out.

A methyl ester of formula Rf-C(O)—OCH$_3$, an acid fluoride of formula Rf-C(O)—F, or a carboxylic acid of formula Rf-C(O)—OH can be converted to a compound of Formula II using a number of conventional methods. For example, a perfluoropolyether monomer of formula Rf-(CO)NHCH$_2$CH$_2$O(CO)C(R)=CH$_2$ can be prepared by first reacting Rf-C(O)—OCH$_3$, for example, with ethanolamine to prepare alcohol-terminated Rf-(CO)NHCH$_2$CH$_2$OH, which can then be reacted with methacrylic acid, methacrylic anhydride, acrylic acid or acryloyl chloride to prepare the compound of Formula II, wherein R is methyl or hydrogen, respectively. Other amino alcohols (e.g., amino alcohols of formula NR$^1$HXOH) can be used in this reaction sequence to provide compounds of Formula II, wherein Q is —C(O)—N(R$^1$)—, and R$^1$ and X are as defined above. In further examples, an ester of formula Rf-C(O)—OCH$_3$ or a carboxylic acid of formula Rf-C(O)—OH can be reduced using conventional methods (e.g., hydride, for example sodium borohydride, reduction) to an alcohol of formula Rf-CH$_2$OH. The alcohol of formula Rf-CH$_2$OH can then be reacted with methacryloyl chloride, for example, to provide a perfluoropolyether monomer of formula Rf-CH$_2$O(CO)C(R)=CH$_2$. Examples of suitable reactions and reagents are further disclosed, for example, in the European patent EP 870 778 A1, published Oct. 14, 1998, and U.S. Pat. No. 3,553,179 (Bartlett et al.), the disclosures of which, relating to reagents and reaction conditions for preparing compounds of Formula II, are incorporated herein by reference.

The reaction of at least one first component and at least one second component is typically carried out in the presence of an added free-radical initiator. Free radical initiators such as those widely known and used in the art may be used to initiate polymerization of the components. Exemplary free-radical initiators are described in U.S. Pat. No. 6,995,222 (Buckanin et al.), the disclosure of which is incorporated herein by reference.

In some embodiments, the reaction of a component of Formula II and a component of at least one of formula $(YO)_2$—$P(O)$—$C(R')$=$CH_2$ or $(YO)_2$—$P(O)$—$O$—$V$—$O$—$C(O)$—$C(R')$=$CH_2$ may be carried out in solvent. The components may be present in the reaction medium at any suitable concentration, (e.g., from about 5 percent to about 80 percent by weight based on the total weight of the reaction mixture). Illustrative examples of suitable solvents include ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), halogenated solvents (e.g., methylchloroform, 1,1,2-trichloro-1,2,2-trifluoroethane, trichloroethylene, trifluorotoluene, and hydrofluoroethers available, for example, from 3M Company, St. Paul, Minn. under the trade designations "HFE-7100" and "HFE-7200"), and mixtures thereof.

Polymerization can be carried out at any temperature suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or even from about 50° C. to about 80° C.).

Free-radical polymerizations may be carried out in the presence of chain transfer agents. Typical chain transfer agents that may be used in the preparation of compositions according to the present invention include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan). The chain-transfer agent typically becomes the monovalent unit in compositions according to the present invention. In some embodiments, the chain-transfer agent is an aliphatic mercaptan, and the monovalent unit is represented by formula —S—C$_t$H$_{2t+1}$, wherein t is an integer from 4 to 22 (in some embodiments, 8 to 22 or even 12 to 22). In some embodiments, the chain-transfer agent is a hydroxyl-substituted mercaptan, and the monovalent unit is represented by formula —S—W—[OH]$_m$, wherein W and m are as defined above. When the monovalent unit is —S—W—[OH]$_m$, it may be converted into a monovalent unit of formula —S—W—[Z]$_m$ using conventional methods. For example, at least one hydroxyl group in —S—W—[OH]$_m$ can be reacted with 2-phosphonoacetic acid or 3-phosphonopropionic at an elevated temperature. The reaction can be carried out, for example, in a suitable solvent (e.g., a ketone or an ether) in the presence of a catalyst (e.g., methanesulfonic acid). Depending on the starting composition and the reaction stoichometry, the resultant monovalent unit may be represented by at least one of —S—C$_b$H$_{2b}$OC(O)C$_b$H$_{2b}$—P(O)(OY)$_2$, —S—C$_b$H$_{2b-1}$[OC(O)C$_b$H$_{2b}$—P(O)(OY)$_2$]$_2$, or —S—C$_b$H$_{2b-1}$(OH)[OC(O)C$_b$H$_{2b}$—P(O)(OY)$_2$], wherein b is as defined above.

Adjusting, for example, the concentration and activity of the initiator, the concentration of each of the first component of Formula II, the second component (in some embodiments), the temperature, the concentration of the chain transfer agent, and the solvent using techniques known in the art can control the molecular weight of a polyacrylate copolymer.

In some embodiments of the reaction of a first component of Formula II and a second component of at least one of formula $(YO)_2$—$P(O)$—$C(R')$=$CH_2$ or $(YO)_2$—$P(O)$—$O$—$V$—$O$—$C(O)$—$C(R')$=$CH_2$, Y is trialkylsilyl. In these embodiments, a trialkylsilyl chloride (e.g., trimethylsilyl chloride, triethylsilyl chloride, t-butyldimethylsilyl chloride, and isopropyldimethylsilyl chloride) is combined with the first and second components, the solvent, initiator, and the chain transfer agent. At the end of the reaction, the reaction mixture can be combined with water to provide a composition according to the present invention having a Z group in which Y is hydrogen. Alternatively, the reaction mixture can be combined with water containing, for example, ammonium hydroxide, sodium hydroxide, or potassium hydroxide to provide a composition having a Z group in which Y is a counter cation (e.g., ammonium, sodium, or potassium). Optionally, the reaction solvent can be removed under reduced pressure using conventional techniques.

In some embodiments, the method of making a composition according to the present invention is carried out in a medium comprising water. In these embodiments, typically a cosolvent is used. Suitable cosolvents include ethers (e.g., tetrahydrofuran, tert-butyl methyl ether), alcohols (e.g., ethanol and isopropanol), and ketones (e.g., methyl ethyl ketone and methyl isobutyl ketone). In some embodiments, the reaction is carried out in the presence of an anionic surfactant as an emulsifier (e.g., sodium dodecyl benzene sulfonate, sodium lauryl sulfate, sodium laureth sulfate, sodium dioctylsulfosuccinate, and reactive emulsifiers available, for example, from Uniqema under the trade designations "MAXEMUL 6106" and "MAXEMUL 6112".

In some embodiments, compositions according to the present invention can be made by reacting at least one first component of Formula II and at least one second component comprising a functional group that can be converted into a Z group (i.e., —P(O)(OY)$_2$ or —O—P(O)(OY)$_2$, wherein Y is as defined above.) For example, the second component may be represented by formula HO—V—O—C(O)—C(R') =CH$_2$, wherein R' and V are as defined above. The reaction product of the first component of Formula II and the second component HO—V—O—C(O)—C(R')=CH$_2$ comprises a divalent unit of formula:

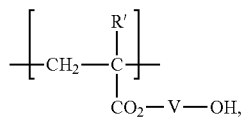

which has a hydroxyl group that may be converted, for example, into —O—P(O)(OY)$_2$ using conventional methods (e.g., reaction with pyrophosphoric acid or POCl$_3$ at an elevated temperature).

In some embodiments, the method of making a composition according to the present invention includes the incorporation of other components (e.g., monomers). In some embodiments, an acrylate or methacrylate monomer represented by Formula III:

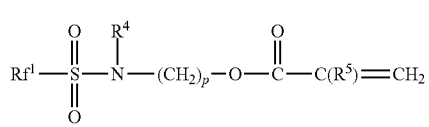

is added, wherein Rf$^1$, R$^4$, R$^5$, and p are as defined above. In some embodiments an acrylate or methacrylate represented by Formula IV:

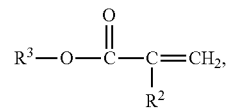

is added, wherein R$^2$ and R$^3$ are as defined above. In some embodiments, vinylidene chloride or vinyl chloride is added. In some embodiments, an acrylate or methacrylate of formula

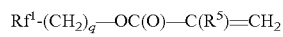

is added, wherein Rf$^1$, q, and R$^5$ are as defined above.

Fluorinated free-radically polymerizable acrylate monomers of formula III, and methods for their preparation, are known in the art; (see, e.g., U.S. Pat. No. 2,803,615 (Albrecht et al.) and U.S. Pat. No. 6,664,354 (Savu et al.), the disclosures of which, relating to free-radically polymerizable monomers and methods of their preparation, are incorporated herein by reference). Methods described for making nonafluorobutanesulfonamido group-containing structures can be used to make heptafluoropropanesulfonamido groups by starting with heptafluoropropanesulfonyl fluoride, which can be made, for example, by the methods described in Examples 2 and 3 of U.S. Pat. No. 2,732,398 (Brice et al.), the disclosure of which is incorporated herein by reference. Methods for making compounds of Formula V are known; (see, e.g., EP1311637 B1, published Apr. 5, 2006, and incorporated herein by reference for the disclosure of the preparation of 2,2,3,3,4,4,4-heptafluorobutyl 2-methylacrylate). Other compounds of Formula V are available, for example, from commercial sources (e.g., 3,3,4,4,5,5,6,6,6-nonafluorohexyl acrylate from Daikin Chemical Sales, Osaka, Japan and 3,3,4,4,5,5,6,6,6-nonafluorohexyl 2-methylacrylate from Indofine Chemical Co., Hillsborough, N.J.).

Compounds of formula IV (e.g., methyl methacrylate, butyl acrylate, hexadecyl methacrylate, octadecyl methacrylate, stearyl acrylate, behenyl methacrylate) are available, for example, from several chemical suppliers (e.g., Sigma-Aldrich Company, St. Louis, Mo.; VWR International, West Chester, Pa.; Monomer-Polymer & Dajac Labs, Festerville, Pa.; Avocado Organics, Ward Hill, Mass.; and Ciba Specialty Chemicals, Basel, Switzerland) or may be synthesized by conventional methods. Some compounds of formula IV are available as single isomers (e.g., straight-chain isomer) of single compounds. Other compounds of formula IV are available, for example, as mixtures of isomers (e.g., straight-chain and branched isomers), mixtures of compounds (e.g., hexadecyl acrylate and octadecylacrylate), and combinations thereof.

Other acrylates may also be added, for example, silicone acrylates available, for example, from Shin-Etsu Silicones of America, Inc., Akron, Ohio, under the trade designation "X22-2426", and urethane acrylates available, for example, from Sartomer Company, Exton, Pa. under the trade designation "CN966J75".

In some embodiments of methods and/or articles of the present invention, compositions according to the present invention are applied to and/or are in contact with a surface. In some embodiments, the surface is metal (including metals and metal alloys). The metal is typically solid at room temperature. For some embodiments, the metal and/or metal alloy is selected from the group consisting of chromium, chromium alloys, iron, aluminum, copper, nickel, zinc, tin, stainless steel, and brass. In some embodiments, the metal and/or metal alloy comprises at least one of gold, platinum, chrominum, aluminum, copper, silver, titanium, indium, germanium, tin, nickel, indium tin. In some embodiments, the surface comprises stainless steel. In some embodiments, the surface comprises at least one of chromium or chromium oxide. In some embodiments, the surface comprises at least one of a metal or metal oxide, and the compound forms at least a partial monolayer on the surface. For some embodiments, a major surface of the metal substrate comprises chromium. An article with a metal surface may comprise other materials (e.g., under the metal surface) which include thermoset and thermoplastic polymers, ceramic, porcelain, as well as other materials capable of having a metallized surface. Examples of articles having metal surfaces include kitchen and bathroom faucets, taps, handles, spouts, sinks, drains, hand rails, towel holders, curtain rods, dish washer panels, refrigerator panels, stove tops, stove, oven, and microwave panels, exhaust hoods, grills, and metal wheels or rims. In some embodiments of methods of treating a metal surface and/or articles comprising a metal surface of the present invention, the Z group (or $Z^1$ group) in compositions according to the present invention is —P(O)(OY)$_2$ (or —P(O)(OY$^1$)$_2$).

Metal substrates and metallized substrates are found in a variety of environments, including kitchens and bathrooms, as well as outdoor areas, where they can come in contact with aqueous residues such as food, soap, and minerals (e.g., lime). Removing such deposits from, for example, faucets, shower heads, and hand rails, often requires aggressive scrubbing, frequently with acidic cleaners or detergents, and often challenge the esthetic appearance and durability of the surface of these substrates. Compositions, methods, and articles according to the present invention typically provide easy-to-clean metal surfaces, which allow removal of aqueous deposits (e.g., mineral deposits) with a wipe without the need for aggressive scrubbing and which retain this property with repeated wipes. Since compositions according to the present invention can render metal surfaces resistant to soils, the optical properties of metal surfaces like those on decorative metal strips and mirrors can be preserved longer.

The compositions of the present invention can be applied to a wide variety of surfaces, which may result in an article that displays durable stain-release properties. These substrates include hard substrates and fibrous substrates. Hard substrates include rigid substrates and non-rigid substrates and include ceramic (including glass), masonry, concrete, natural stone, man-made stone, metals, wood, plastics, and painted surfaces. Fibrous substrates include woven, knit, and nonwoven fabrics, textiles, carpets, leather, and paper. Substrates can have flat or curved surfaces and may be particulate and fibrous in nature, as well. In some embodiments, substrates (including hard substrates) are capable of imbibing a liquid and are therefore porous. Such substrates are particularly subject to staining and soiling, but can benefit from the chemical compositions of the present invention because the coating composition can penetrate into the porous substrate surface. Without wanting to be bound by theory, it is believed that substrates comprising nucleophilic groups selected from the group consisting of —OH and —NHR, wherein R is H or lower alkyl can bond to the Z groups of the chemical compositions of the present invention, typically increasing durability. Substrates of this type include those having siliceous and metallic surfaces.

Representative examples of articles that can be coated with compositions according to the present invention include lenses used in ophthalmic spectacles, sunglasses, optical instruments, illuminators, watch crystals; glass panels (e.g., automotive windows); plastic window glazing; signs; decorative surfaces such as wallpaper and vinyl flooring; composite or laminated substrates (e.g., sheeting available from Formica Corporation, Cincinnati, Ohio under the trade designation "FORMICA" and flooring available, for example, from Pergo, Raleigh, N.C. under the trade designation "PERGO"); ceramic tile and fixtures (sinks, showers, toilets); natural and man-made stones; decorative and paving stones (e.g., marble, granite, limestone, and slate); cement and stone sidewalks and driveways; particles that comprise grout or the finished surface of applied grout; wood furniture surface (e.g., desktops and tabletops); cabinet surfaces; wood flooring, decking, and fencing; leather; paper; fiber glass fabric and other fiber-containing fabrics; textiles; and carpeting.

Compositions according to the present invention can make wood surfaces more resistant to food and beverage stains while helping to maintain a lustrous appearance. In addition, the compositions can be applied as a protective coating on aircraft wings, boat hulls, fishing line, medical surfaces, and siding, and can be used in food release, mold release, and adhesive release applications.

In some embodiments of methods of treating a cementicious surface (e.g., grout, engineered stone, stone, and concrete) and/or articles comprising a cementicious surface of the present invention, the Z group (or Z' group) in compositions according to the present invention is —O—P(O)(OY)$_2$ (or —O—P(O)(OY$^1$)$_2$).

In methods according to the present invention, a surface is contacted with a composition of the present invention. In some embodiments, the composition is present in a formulation comprising at least one of solvent or water. In some embodiments, the solvent comprises at least one of a hydrofluoroether or a lower alcohol (e.g., methanol, ethanol, propanol, isopropanol, isobutanol, butanol, sec-butanol).

In some embodiments, the solvent is a hydrofluoroether. Suitable hydrofluoroethers can be represented by the following general formula:

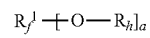

where a is an integer of 1 to 3, $R_f^1$ is a monovalent, divalent, or trivalent perfluoroalkyl, that is linear, branched, cyclic, or combinations thereof and that is optionally interrupted by at least one ether linkage (i.e., —O—); and $R_h$ an alkyl group that is linear, branched, cyclic, or combinations thereof and optionally contains at least one heteroatom (e.g., N, O, or S). For example, the hydrofluoroether can be methyl perfluorobutyl ether or ethyl perfluorobutyl ether.

In some embodiments, the formulation comprises water. In these embodiments, the formulation may also include solvent. In some embodiments wherein the formulation comprises water, it further comprises at least one of a nonionic or anionic surfactant. Suitable surfactants include those described in U.S. Pat. No. 6,995,222 (Buckanin et al.), the disclosure of which, relating to its description of surfactants, is incorporated herein by reference.

Typically, formulations according to the present invention include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight of at least one composition according to the present invention, based on the total weight of the formulation. For example, the amount of the composition in the formulation may be in a range of from 0.01 to 10; 0.1 to 10, 0.1 to 5, 1 to 10, or even in a range from 1 to 5 percent by weight, based on the total weight of the formulation. In some embodiments of formulations comprising water, compositions according to the present invention are present at 0.1 to 5%, 1.5% to 5%, 2% to 5%, or 0.5 to 3%, based on the total weight of the formulation. Lower and higher amounts of the compositions may also be used, and may be desirable for some formulations and applications.

In some embodiments of methods of treating a surface according to the present invention, the composition is allowed to dry for about 1 to 24 (in some embodiments, 4 to 24 or even 8 to 24) hours. In some embodiments, the drying takes place at ambient temperature (e.g., 15 to 35° C.). In some embodiments, the composition is dried at elevated temperature (e.g., 50° C. to 150° C., or even 50° C. to 100° C.). Without wanting to be bound by theory, it is believed that during the drying time and over a subsequent period of time, compositions according to the present invention can form chemical bonds with the substrate and/or between molecules of the chemical composition.

In methods according to the present invention, any method of application of compositions according to the present invention on a surface may be used. Examples of useful application methods include spraying (e.g., with a spray bottle), padding, dipping (i.e., immersing the substrate in a formulation), spin-coating, flow coating, vacuum coating, painting, and wiping (e.g., with a sponge or cloth). When treating flat substrates of appropriate size, knife-coating or bar-coating may be used to ensure uniform coatings on a substrate.

The coating compositions can be applied to a substrate in any desired thickness. Coatings as thin as 20 (in some embodiments, 30, 40, or 50) nanometers up to 5 (in some embodiments, 4, 3, 2, or 1) micrometers can offer excellent low surface energy, stain-resistance, and/or stain-release. Thicker coatings (e.g., in the range of 1 to 5 micrometers) can be obtained by applying to the substrate a single thicker layer of a coating composition that contains a relatively high concentration of the chemical composition of the present invention. Thicker coatings can also be obtained by applying successive layers to the substrate of a coating composition that contains a relatively low concentration of the chemical composition of the present invention. The latter can be done by applying a layer of the coating composition to the substrate and then drying prior to application of a successive layer. Successive layers of the coating can then be applied to dried layers. This procedure can be repeated until the desired coating thickness is achieved.

Articles according to the present invention, having a surface in contact with a composition according to the present invention have typically been found to be at least one of non-staining, stain-releasing with simple washing methods, oil resistant (e.g., resistant to fingerprints), resistant to lime deposits, or resist being worn-off due to wear and abrasion from use, cleaning, and the elements.

Embodiments and advantages of this invention are further illustrated by the following non-limiting examples, but the particular materials and amounts thereof recited in these examples, as well as other conditions and details should not be construed to unduly limit this invention.

Unless otherwise noted, all parts, percentages, ratios, etc. in the examples and the rest of the specification are by weight.

EXAMPLES

In the following examples, all reagents were obtained from Sigma-Aldrich, St. Louis, Mo. unless indicated otherwise. All percentages and ratios reported are by weight unless indicated otherwise.

Preparation of $C_3F_7O(C_3F_6O)_kCF(CF_3)C(O)NHCH_2CH_2OC(O)CH=CH_2$ (HFPOA), $C_3F_7O(C_3F_6O)_kCF(CF_3)COOCH_3$ was prepared as described in U.S. Pat. No. 6,995,222 (Buckanin et al.), Preparative Example 1, the disclosure of which example isincorporated herein by reference, as a mixture containing 0.002% k=2, 5.9% k=3, 25.2% k=4, 27% k=5, 20.7% k=6, 12.4% k=7, 5.4% k=8, 1.8% k=9, and 0.5% k=10 as determined by gas/liquid chromatography and gas/liquid chromatography/mass spectrometry, and having a number average molecular weight of 1232 grams per mole as calculated from the chromatography data.

$C_3F_7O(C_3F_6O)_kCF(CF_3)COOCH_3$ was treated with 2-aminoethanol as described on column 16, lines 37-62 of U.S. Pat. No. 7,094,829 (Audenaert et al.), the disclosure of which is incorporated herein by reference, to provide $C_3F_7O(C_3F_6O)_kCF(CF_3)C(O)NHCH_2CH_2OH$.

In a 500-mL 3-necked flask fitted with a mechanical stirrer, a thermometer, and a condenser, 121.6 grams (0.1 mol) $C_3F_7O(C_3F_6O)_kCF(CF_3)C(O)NHCH_2CH_2OH$, 60 grams of methyl ethyl ketone, 60 grams of a hydrofluoroether obtained from 3M Company, St. Paul, Minn. under the trade designation "HFE-7200", 10.1 grams of triethylamine (0.1 mol) 0.01 grams of hydroquinone monomethyl ether (MEHQ), and 0.01 grams of phenothazine were combined. The mixture was cooled to about 5° C. using an ice bath, and 10.1 grams (0.11 mol) of acrylochloride were added over about 1 hour under nitrogen. An exothermic reaction was observed, and a precipitate formed. The temperature was allowed to rise to 25° C. and stirred for about 1 hour. The reaction was warmed to 50° C. and stirred under nitrogen for another hour. The resulting mixture was washed 3 times with water (200 mL). The resulting organic solution was distilled at 50° C. under vacuum to remove the solvents and to provide 123.2 grams of HFPOA as a clear, brownish-yellow liquid, identified by $^1H$ and $^{19}F$ nuclear magnetic resonance spectroscopy.

Example 1

Part A

In a 250-mL 3-necked flask equipped with a mechanical stirrer, a condenser, and a thermometer, 52.6 grams (0.04 mole) of HFPOA, 0.9 grams (0.01 mol) of 2-mercaptoethanol, 55 grams of methyl isobutyl ketone (MIBK), and 10 grams of "HFE-7200" hydrofluoroether were combined. The mixture was degassed, and 0.1 gram of 2,2'-azobis(2-methylbutyronitrile) (obtained from Dupont Chemical Co., Wilmington, Del., under the trade designation "VAZO-67") was added. The reaction was heated to 65° C. under nitrogen for 6 hours. Additional 2,2'-azobis(2-methylbutyronitrile) ("VAZO-67") (0.05 gram) was added, and the reaction was continued for 16 hours at 65° C.

Part B

In a 500-mL 3-necked flask equipped with a mechanical stirrer, a Dean-Stark trap condenser, and a thermometer, 53.4 grams (0.01 mole) of the material from Part A, 1.4 grams (0.01 mole) 2-phosphonoacetic acid, 40 grams of methyl isobutyl ketone (MIBK), and 0.5 gram of methanesulfonic acid were added. The reaction was heated at reflux for 6 hours. During this time about 1.8 gram of water were collected in the Dean-Stark trap. The MIBK was removed under vacuum. The product was analyzed by $^1$H, $^{19}$F, and $^{31}$P nuclear magnetic resonance spectroscopy. The product was diluted to 0.1% with isopropanol for evaluation.

Example 2

Example 2 was prepared as described in Example 1 except using 1.1 gram (0.01 mole) 3-mercapto-1,2-propanediol in Part A instead of 2-mercaptoethanol. The resulting oligomer was treated with 2-phosphonoacetic acid as described in Part B of Example 1. The product was diluted to 0.1% with isopropanol for evaluation.

Example 3

In a 3-necked, 250-mL flask equipped with a mechanical stirrer, a condenser, and a thermometer, HFPOA (35 grams), 10 grams of octadecylmethacrylate (ODMA), 2.5 grams of vinylphosphonic acid, 2.5 grams of octylmercaptan, 20 grams of "HFE-7200" hydrofluoroether, and 30 grams of isopropanol (IPA) were combined. The reaction mixture was degassed under vacuum and purged with nitrogen, and 0.1 gram of "VAZO-67" 2,2'-azobis(2-methylbutyronitrile) was added. The reaction was heated to 65° C. under nitrogen for 6 hours. Additional "VAZO-67" 2,2'-azobis(2-methylbutyronitrile) (0.05 gram) was added, and the reaction was continued for 16 hours at 65° C. A clear solution was obtained. About 0.1% by weight of the starting monomers remained as evidenced by by gas/liquid chromatography analysis. The product was diluted with "HFE-7200" to 0.1% for evaluation.

Examples 4 and 5

Examples 4 and 5 were prepared as described for Example 3 except using the amounts of the reagents listed in Table 1, below. For these reactions, 20 grams of "HFE-7200" and 30 grams of IPA were used. The products were diluted to 0.1% with isopropanol for evaluation.

TABLE 1

| Example | HFPOA | ODMA | mercaptan | Vinylphosphonic acid |
|---|---|---|---|---|
| 4 | 45 grams | 10 grams | Mercaptopropanediol (2.5 grams) | 5 grams |
| 5 | 35 grams | 10 grams | Octylmercaptan (2.5 grams) | 7.5 grams |

Comparative Example

The method described in Example 2 of U.S. Pat. App. Pub. No. 2005/0048288 (Flynn et al.) was used to prepare a composition of formula:

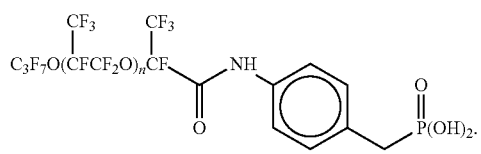

The product was diluted to 0.1% with hydrofluoroether "HFE-7200", for evaluation.

Evaluation of Examples 1 to 5 and Comparative Example

The substrates used to test Examples 1-5 were obtained from Ideal Standard, Wittlich, Germany and were metal fittings with a layer of electroplated chromium on the surface.

The substrates were cleaned by dipping for 15 minutes at 70° C. in a 10% sodium hydroxide solution. The substrates were rinsed thoroughly with water, dried, and cleaned with acetone and hydrofluoroether obtained from 3M Company under the trade designation "HFE-7100". The solutions of Examples 1, 2, 4, and 5 were applied to the substrates by spray application (2 bar and 20 mL/minute). The solution of Example 3 was applied to the substrate using a saturated paper wipe. The substrates were dried at room temperature and heated to 70° C. for 5 minutes and allowed to stand at room temperature for 24 hours before testing. Static contact angles were measured versus water and hexadecane on the substrates treated with Examples 1 to 5 and an untreated substrate using an Olympus model TGHM goniometer (obtained from Olympus Corporation of America, Pompano Beach, Fla.). An abrasion test was carried out by wiping with a wipe (obtained from 3M Company under the trade designation "3M HIGH PERFORMANCE WIPE") 200 times. Static contact angles were measured again after the abrasion test. For contact angles measurements, the mean values of 3 measurements and are reported in degrees in Table 2 (below).

TABLE 2

| Treatment | Initial contact angle Water/hexadecane | Contact angle after abrasion Water/hexadecane | Hard-water cleanability rating |
|---|---|---|---|
| No treatment | 42-55/<20 | 40/<20 | 1 |
| Example 1 | 98/66 | 80/45 | 7 |
| Example 2 | 95/63 | 82/48 | 7 |
| Example 3 | 93/73 | 82/47 | 7 |
| Example 4 | 92/65 | 81/45 | 7 |
| Example 5 | 96/62 | 84/47 | 7 |
| Comparative Example | 98/70 | 72/40 | 5 |

The cleanability of the fittings treated with solutions of Examples 1 to 5 and an untreated disc was carried out by applying mineral water (obtained from Tonissteiner, Germany). The water was sprayed at 0.5 bar (5×10$^4$ Pa) at room temperature until the substrate was completely covered. The substrate was placed in an oven for two hours at 70° C., removed, and allowed to cool. Limestone deposits were present on the substrates, which were then cleaned with a dry paper wipe. The cleaning results were evaluated visually and rated on a scale of 0 (no visible removal of the deposits) to 10 (no visible marks left after 3 wipes). The results are shown in Table 2 (above).

Example 6

A flask was charged with 34 grams $C_3F_7O(C_3F_6O)_kCF$ $(CF_3)C(O)NHCH_2CH_2OC(O)C(CH_3)=CH_2$ (HFPOMA) (prepared as described in U.S. Pat. No. 6,995,222 (Buckanin et al.), Preparative Example 3, the disclosure of which example is incorporated herein by reference), 7 grams octadecyl mercaptan, 5 grams (23 mmol) ethyleneglycol methacrylate phosphate followed by 295 grams tetrahydrofuran (THF). After about 3 minutes, 5.2 grams (48 mmol) trimethylsilyl chloride was added. The solution was stirred and purged with nitrogen for 5 minutes and 0.4 gram of "VAZO-67" 2,2'-azobis(2-methylbutyronitrile) was added. The solution heated at 60° C. for 15 hours. After this period, a solution of 760 grams deionized water and 1.4 gram sodium dodecyl benzene sulfonate (obtained from Rhodia, Blue Island, Ill. under the trade designation "DS-10") at 70° C. was added, and the resulting mixture was allowed to stir for 10 minutes. The mixture was transferred to a beaker and stirred while sonicating for 6 minutes. The THF was removed from the resulting emulsion by rotary evaporation to give a stable emulsion. A sample was diluted with water and isopropanol (IPA) to make 3% solids overall with 10% IPA based on total solution weight.

Example 7

A beaker was charged with 34 grams HFPOMA, 2.5 grams ethyleneglycol methacrylate phosphate, 100 grams THF, and 200 grams MIBK. The mixture was heated to 60° C., and a solution of 393 grams deionized water and 0.8 gram "DS-10" sodium dodecyl benzene sulfonate solution at 60° C. was added with stirring. The resulting emulsion was sonicated for 5 minutes and transferred into a reaction flask. The emulsion was purged nitrogen for 5 minutes, and 0.4 gram sodium persulphate and 0.4 gram "VAZO-67" 2,2'-azobis(2-methylbutyronitrile) were added. The emulsion was heated at 60° C. for 15 hours. The THF and MIBK were removed by rotary evaporation to give a stable emulsion. A sample was diluted with water and IPA to make 3% solids overall with 10% IPA based on total solution weight.

Example 8

A flask was charged with 30 grams HFPOMA, 10 grams N-methylperfluorobutanesulfonamidoethyl methacrylate (MeFBSEMA), 7.5 grams octadecyl acrylate, 2.5 grams ethyleneglycol methacrylate phosphate followed by 58 grams THF and 58 grams IPA. The solution was stirred and purged with nitrogen for 5 minutes and 0.5 grams of "VAZO-67" 2,2'-azobis(2-methylbutyronitrile) were added. The solution heated at 60° C. for 15 hours. After this period, a solution of 283 grams deionized water and 1.3 gram potassium hydroxide (KOH) at 70° C. was added. The resulting emulsion was transferred to a beaker and stirred while sonicating for 4 minutes. The THF and IPA were removed by rotary evaporation to give a stable emulsion. A sample was diluted with water and IPA to make 3% solids overall with 10% IPA based on total solution weight.

MeFBSEMA was made according to the method of U.S. Pat. No. 6,664,354 (Savu), Example 2, Parts A and B, incorporated herein by reference, except using 3420 kg of N-methylperfluorobutanesulfonamidoethanol, 1.6 kg of phenothiazine, 2.7 kg of methoxyhydroquinone, 1400 kg of heptane, 980 kg of methacrylic acid (instead of acrylic acid), 63 kg of methanesulfonic acid (instead of triflic acid), and 7590 kg of water in Part B.

Example 9

Part A
To a round bottom flask was added 1 gram of octadecyl 3-mercaptopropionate (obtained from Hampshire Chemicals, owned by Dow Chemical Co. Midland, Mich.), 2.5 grams of ethylene glycol methacrylate phosphate, 6.5 grams of HFPOMA, 15 grams of N-methylperfluorobutanesulfonamidoethyl acrylate (MeFBSEA), 60 grams MIBK, and 15 grams IPA. This mixture was agitated using a mechanical stirrer and warmed to 50° C. Nitrogen was bubbled through the mixture for 10 minutes before 0.15 gram "VAZO-67" 2,2'-azobis(2-methylbutyronitrile) was added, and the temperature was raised to 70° C. The reaction mixture was heated at 70° C. for 15 hours under nitrogen. Analysis by infrared spectroscopy (IR) indicated absence of an unsaturation peak at 1637 cm$^{-1}$ indicating polymerization was complete.

MeFBSEA was made according to the method of U.S. Pat. No. 6,664,354 (Savu), Example 2, Parts A and B, incorporated herein by reference, except using 4270 kg of N-methylperfluorobutanesulfonamidoethanol, 1.6 kg of phenothiazine, 2.7 kg of methoxyhydroquinone, 1590 kg of heptane, 1030 kg of acrylic acid, 89 kg of methanesulfonic acid (instead of triflic acid), and 7590 kg of water in Part B.
Part B To 150 grams of water at 60° C. was added 1.3 grams of KOH, and the mixture was stirred until the KOH was fully dissolved. To this solution was added, with stirring, the solution from Part A at 60° C., and the blend homogenized using a sonicator obtained from Branson (Danbury, Conn.) under the trade designation "SONIFIER 450" in the pulse mode for 2 minutes. The MIBK and IPA were evaporated under vacuum. A bluish emulsion of 20.8% solids was obtained.

Example 10

Part A
To a round bottom flask was added 2 grams of octadecyl 3-mercaptopropionate (obtained from Hampshire Chemicals), 2 grams of ethylene glycol methacrylate phosphate, 18 grams of N-methylperfluorobutanesulfonamidoethyl acrylate (MeFBSEA), and 3 grams of Octadecyl acrylate (obtained from Sigma-Aldrich) 40 grams MIBK, and 10 grams IPA. This mixture was agitated using a mechanical stirrer and warmed to 50° C. Nitrogen was bubbled through the mixture for 10 minutes before 0.15 gram "VAZO-67" 2,2'-azobis(2-methylbutyronitrile) was added, and the temperature was raised to 70° C. The reaction mixture was heated at 70° C. for 15 hours under nitrogen. Analysis by infrared spectroscopy (IR) indicated absence of an unsaturation peak at 1637 cm$^{-1}$ indicating polymerization was complete.
Part B
The procedure of Example 9, Part B was followed except 1.3 gram of KOH was replaced with 2 grams of 30% ammonia solution (obtained from J. T. Baker, Phillipsburg, N.J.).

Evaluation of Examples 6 to 10

Preparation and Testing of Grout Sealer

Grout blanks were prepared per the manufacturer's instruction by mixing water with sanded grout obtained from TEC Specialty Products, Inc., Arlington, Ill., under the trade designation "ACCUCOLOR SANDED GROUT", then applying grout to 2 inch (5 cm) by 4 inch (11 cm) backer board coupons. These coated coupons were allowed to cure in ambient lab conditions (approximately 70° F. (21° C.) and 50% relative humidity) for four days.

Once the grout was dried for about three days, coupons were coated with experimental sealers, as well as two commercially available offerings: a sealer obtained from TEC under the trade designation "TEC GUARD ALL INVISIBLE PENETRATING SEALER" (Comparative Example 2) and a sealer obtained from Custom Building Products, Seal Beach, Calif., under the trade designation "TILELAB SURFACEGARD PENETRATING SEALER" (Comparative Example 3). These sealed grout samples were allowed to dry in lab conditions for approximately 18 to 20 hours before stains were applied.

The sealed grout coupons were soiled with 8 drops (approximately 0.5 mL) each of coffee (Folgers Classic Roast instant), grape juice (Welch's 100% Grape Juice), and Merlot (Ravenswood Vintners Blend 2003). These stains were left to reside on the grouted, sealed surface for one hour.

After the hour, residual stain media were blotted dry with a paper towel before cleaning. The cleaning procedure used a dishwashing soap solution, prepared by diluting dishwashing soap, obtained from Procter and Gamble, Cincinnati, Ohio, under the trade designation "DAWN DISHWASHING SOAP" to 5% using distilled water, as a cleaning agent. Each grout coupon is sprayed with 0.48 gram (+/−0.01 g) cleaning medium then hand scrubbed with 20 double scrubs from a large O-Cel-O sponge (obtained from 3M Company). Upon cleaning, samples were graded as to degree of stain removal on a five point visual scale, with 5 being complete stain removal, and 1 being no removal of staining medium.

The results for Examples 6 to 10 are given in Table 3, below.

TABLE 3

| Treatment | Rating |
| --- | --- |
| Example 6 | 4 |
| Example 7 | 2 |
| Example 8 | 4 |
| Example 9 | 4 |
| Example 10 | 4 |
| Comparative Example 2 | 4 |
| Comparative Example 3 | 2 |

Various modifications and alterations of this invention may be made by those skilled in the art without departing from the scope and spirit of this invention, and it should be understood that this invention is not to be unduly limited to the illustrative embodiments set forth herein.

What is claimed is:

1. A polymeric or oligomeric composition comprising a first divalent unit represented by formula:

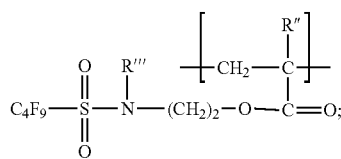

and (a) a second divalent unit represented by formula:

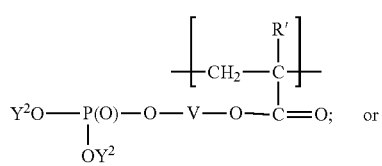

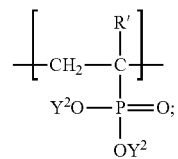

and a monovalent unit selected from the group consisting of —S—$C_tH_{2t+1}$ and —S—$C_rH_{2r}$-A, (b) a second divalent unit represented by formula:

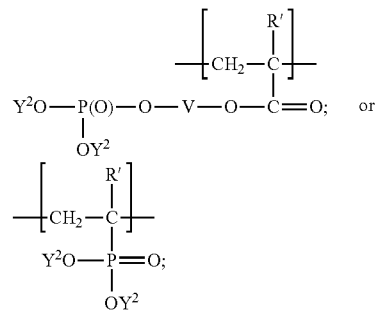

and a monovalent unit represented by a formula selected from the group consisting of:

—S—$C_bH_{2b}OC(O)C_bH_{2b}$—$P(O)(OY^2)_2$; and

—S—$C_bH_{2b-1}[OC(O)C_bH_{2b}$—$P(O)(OY^2)_2]_2$, or (c) a monovalent unit represented by a formula selected from the group consisting of:

—S—$C_bH_{2b}OC(O)C_bH_{2b}$—$P(O)(OY^2)_2$; and

—S—$C_bH_{2b-1}[OC(O)C_bH_{2b}$—$P(O)(OY^2)_2]_2$, wherein

R', R", and R'" are each independently hydrogen or alkyl having from 1 to 4 carbon atoms;

V is alkylene that is optionally interrupted by at least one ether linkage or amine linkage;

t is an integer having a value from 4 to 22;

r is an integer having a value from 2 to 10;

A is selected from the group consisting of —OH, —$COOY^2$, and —$SO_3Y^2$;

each $Y^2$ is independently selected from the group consisting of hydrogen, alkyl, and a counter cation; and each b is independently an integer from 1 to 5.

2. The polymeric or oligomeric composition of claim 1, wherein the polymeric or oligomeric composition comprises the second divalent unit represented by formula:

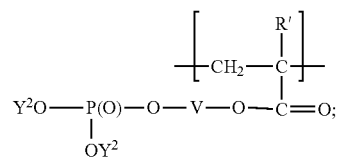

and
the monovalent unit selected from the group consisting of —S—$C_tH_{2t+1}$ and —S—$C_rH_{2r}$-A.

3. The polymeric or oligomeric composition of claim 1, wherein the polymeric or oligomeric composition comprises the second divalent unit represented by formula:

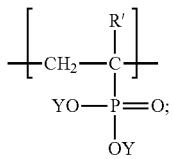

and
the monovalent unit selected from the group consisting of —S—$C_tH_{2t+1}$ and —S—$C_rH_{2r}$-A.

4. The polymeric or oligomeric composition of claim 1, wherein the polymeric or oligomeric composition comprises the monovalent unit represented by a formula selected from the group consisting of:

—S—$C_bH_{2b}$OC(O)$C_bH_{2b}$—P(O)(OY)$_2$; and

—S—$C_bH_{2b-1}$[OC(O)$C_bH_{2b}$—P(O)(OY)$_2$]$_2$.

5. The polymeric or oligomeric composition of claim 1, further comprising at least one divalent unit represented by formula:

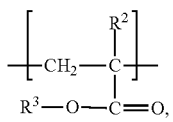

wherein
each $R^2$ is independently selected from the group consisting of hydrogen and alkyl having from 1 to 4 carbon atoms; and
each $R^3$ is independently alkyl having from 1 to 30 carbon atoms.

6. A formulation comprising the polymeric or oligomeric composition of claim 1 and solvent, wherein the solvent comprises at least one of an alcohol or a hydrofluoroether.

7. A formulation comprising the polymeric or oligomeric composition of claim 1 and water.

8. The formulation of claim 7, further comprising at least one of a nonionic or an anionic surfactant.

9. A method of treating a surface, the method comprising contacting the surface with the polymeric or oligomeric composition of claim 1.

10. The method of claim 9, wherein the surface comprises at least one of metal, metal oxide, ceramic, natural stone, or a cementicious surface.

11. The method of claim 9, wherein the surface comprises at least one of stainless steel, chromium, or chromium oxide.

12. An article having a surface, wherein at least a portion of the surface is in contact with a polymeric or oligomeric composition, the polymeric or oligomeric composition comprising a first divalent unit represented by formula:

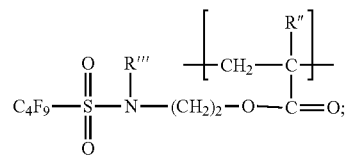

and
(a) a second divalent unit represented by formula:

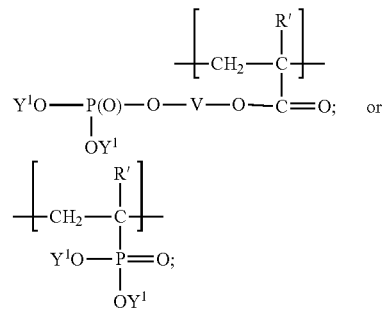

and
a monovalent unit selected from the group consisting of —S—$C_tH_{2t+1}$ and —S—$C_rH_{2r}$-A,
(b) a second divalent unit represented by formula:

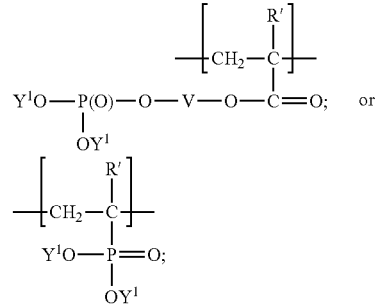

and
a monovalent unit represented by a formula selected from the group consisting of:

—S—$C_bH_{2b}$OC(O)$C_bH_{2b}$—P(O)(OY$^1$)$_2$; and

—S—$C_bH_{2b-1}$[OC(O)$C_bH_{2b}$—P(O)(OY$^1$)$_2$]$_2$, or (c) a monovalent unit represented by a formula selected from the group consisting of:

—S—$C_bH_{2b}$OC(O)$C_bH_{2b}$—P(O)(OY$^2$)$_2$; and

—S—$C_bH_{2b-1}$[OC(O)$C_bH_{2b}$—P(O)(OY$^2$)$_2$]$_2$, wherein
R', R", and R''' are each independently hydrogen or alkyl having from 1 to 4 carbon atoms;
V is alkylene that is optionally interrupted by at least one ether linkage or amine linkage;
t is an integer having a value from 4 to 22;
r is an integer having a value from 2 to 10;
A is selected from the group consisting of —OH, —COOY$^1$, and —SO$_3$Y$^1$;

each $Y^1$ is independently selected from the group consisting of hydrogen, alkyl, a counter cation, and a bond to the surface; and each b is independently an integer from 1 to 5.

13. The article of claim 12, wherein the surface comprises at least one of metal, metal oxide, ceramic, natural stone, or a cementicious surface.

14. The article of claim 12, wherein the surface comprises at least one of a metal or metal oxide, and wherein the compound forms at least a partial monolayer on the surface.

15. The article of claim 12, wherein the surface comprises at least one of chromium or chromium oxide.

16. The article of claim 12, wherein the article is at least one of a faucet, a faucet handle, a sink, an oven range, an oven range hood, a countertop, flooring, or wall covering.

17. The article of claim 12, wherein the surface of the article comprises stainless steel.

18. A method of making a polymeric or oligomeric composition, the method comprising reacting components comprising at least one component represented by formula:

Rf—C(O)—N(R$^1$)—X—O—C(O)—C(R)=CH$_2$; and at least one component represented by formula:

(YO)$_2$—P(O)—C(R')=CH$_2$ or (YO)$_2$—P(O)—O—V—O—C(O)—C(R')=CH$_2$;

wherein
each Rf is independently a perfluoropolyether group;
R, R', and R$^1$ are each independently selected from the group consisting of hydrogen and alkyl having from 1 to 4 carbon atoms;
each V is independently alkylene that is optionally interrupted by at least one ether linkage or amine linkage; and
each Y is independently selected from the group consisting of hydrogen, alkyl, trialkylsilyl, and a counter cation, and X is selected from the group consisting of alkylene, arylakylene, and alkylarylene, wherein the alkylene, arylakylene, and alkylarylene are each optionally interrupted by at least one ether linkage.

19. The method according to claim 18, wherein reacting is carried out in a medium comprising water.

20. The method according to claim 19, wherein the medium further comprises an emulsifier.

* * * * *